(12) United States Patent
Yen et al.

(10) Patent No.: US 12,287,657 B2
(45) Date of Patent: Apr. 29, 2025

(54) SIGNAL CONVERSION CIRCUIT

(71) Applicant: Sercomm Corporation, Taipei (TW)

(72) Inventors: Chih-Liang Yen, Taipei (TW); Jianmin Kong, Suzhou (CN); Peng Xu, Suzhou (CN)

(73) Assignee: Sercomm Corporation, Taipei (TW)

( * ) Notice: Subject to any disclaimer, the term of this patent is extended or adjusted under 35 U.S.C. 154(b) by 40 days.

(21) Appl. No.: 18/463,246

(22) Filed: Sep. 7, 2023

(65) Prior Publication Data
US 2024/0143004 A1 May 2, 2024

(30) Foreign Application Priority Data
Oct. 31, 2022 (CN) .......................... 202211349519.1

(51) Int. Cl.
*H04B 3/54* (2006.01)
*G05F 1/56* (2006.01)

(52) U.S. Cl.
CPC .............. *G05F 1/56* (2013.01); *H04B 3/542* (2013.01); *H04B 3/548* (2013.01)

(58) Field of Classification Search
CPC .................... H04B 3/548; H04B 2203/547
See application file for complete search history.

(56) References Cited

U.S. PATENT DOCUMENTS

| | | | | |
|---|---|---|---|---|
| 4,689,620 A * | 8/1987 | Wondrak | ............... | H04L 5/1423 340/854.9 |
| 4,691,328 A * | 9/1987 | Sterling, Jr. | ........... | G08C 19/02 340/310.17 |
| 5,448,231 A * | 9/1995 | Takezoe | .................. | H04L 12/40 340/509 |
| 6,703,943 B1 * | 3/2004 | Lalla | ...................... | G08C 19/02 340/870.34 |
| 7,390,115 B1 * | 6/2008 | Huang | ..................... | B60Q 1/46 340/815.45 |
| 9,787,360 B2 * | 10/2017 | Braunshtein | ........... | H04B 3/548 |
| 9,929,773 B2 * | 3/2018 | Kanazawa | ............... | H04B 3/54 |
| 10,170,929 B2 * | 1/2019 | Shao | ....................... | H02J 7/345 |
| 10,528,502 B2 * | 1/2020 | Ngo | ...................... | G06F 13/364 |
| 10,572,408 B2 * | 2/2020 | Kataoka | ................. | H04B 3/548 |
| 10,840,973 B2 * | 11/2020 | Gerwig | ............. | H04L 12/40045 |
| 11,005,531 B1 * | 5/2021 | Delshadpour | ......... | H04B 3/548 |
| 2012/0235710 A1 * | 9/2012 | Roessler | .............. | H03K 17/567 327/109 |

* cited by examiner

*Primary Examiner* — Thomas J. Hiltunen
(74) *Attorney, Agent, or Firm* — JCIPRNET (57) ABSTRACT

A signal conversion circuit including a voltage adjustment circuit and a control circuit is provided. An input terminal and an output terminal of the voltage adjustment circuit are respectively coupled to a power voltage and an output terminal of the signal conversion circuit. The control circuit provides a control signal to a control terminal of the voltage adjustment circuit, controls the control signal to change between a first control voltage level and a second control voltage level according to a signal level of an input data signal, or decides whether to provide a default voltage to the output terminal of the voltage adjustment circuit according to the input data signal.

8 Claims, 7 Drawing Sheets

SIGNAL CONVERSION CIRCUIT

CROSS-REFERENCE TO RELATED APPLICATION

This application claims the priority benefit of China application serial no. 202211349519.1, filed on Oct. 31, 2022. The entirety of the above-mentioned patent application is hereby incorporated by reference herein and made a part of this specification.

BACKGROUND

Technical Field

The invention relates to a signal conversion circuit, and particularly relates to a signal conversion circuit integrating a data signal and a power signal.

Description of Related Art

Generally, data signals and power signals are transmitted separately so that two lines are required for transmitting the signals respectively. However, some products have a limited size for accommodation, or even cannot accommodate independent circuit wirings of the data signals and power signals, so that wiring difficulty is greatly increased. In addition, due to the increased difficulty of wiring, circuit wiring is often unnecessarily extended, and in the case of long-distance transmission, the transmitted signal is prone to be interfered or attenuated.

In addition, existing products often use multiple power sources respectively with different voltage levels to generate data signals. When a size of the product is limited, it is not suitable to adopt a circuit design with multiple power sources respectively with different voltage levels. In addition, the multiple power sources respectively with different voltage levels also bring more signal interference issues.

SUMMARY

The invention is directed to a signal conversion circuit, which may effectively reduce wiring difficulty and ensure signal transmission quality.

The invention provides a signal conversion circuit including a voltage adjustment circuit and a control circuit. An input terminal and an output terminal of the voltage adjustment circuit are respectively coupled to a power voltage and an output terminal of the signal conversion circuit. The control circuit is coupled to the voltage adjustment circuit, provides a control signal to a control terminal of the voltage adjustment circuit, controls the control signal to change between a first control voltage level and a second control voltage level according to a signal level of an input data signal, or decides whether to provide a default voltage to the output terminal of the voltage adjustment circuit according to the input data signal.

Based on the above description, the input terminal and the output terminal of the voltage adjustment circuit in the embodiment of the invention are respectively coupled to the power voltage and the output terminal of the signal conversion circuit, and the control circuit may provide the control signal to the control terminal of the voltage adjustment circuit, control the control signal to change between a first control voltage level and a second control voltage level according to a signal level of an input data signal, or decide whether to provide the default voltage to the output terminal of the voltage adjustment circuit according to the input data signal, so as to convert the input data signal into the data power signal. In this way, the input data signal and the power voltage are integrated to generate the data power signal, and only one transmission line is needed to achieve the effect of simultaneously transmitting the data signal and the power signal, which reduces the wiring difficulty and ensures that the data signal will not be interfered in long-distance transmission, thereby greatly improving the signal transmission quality.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
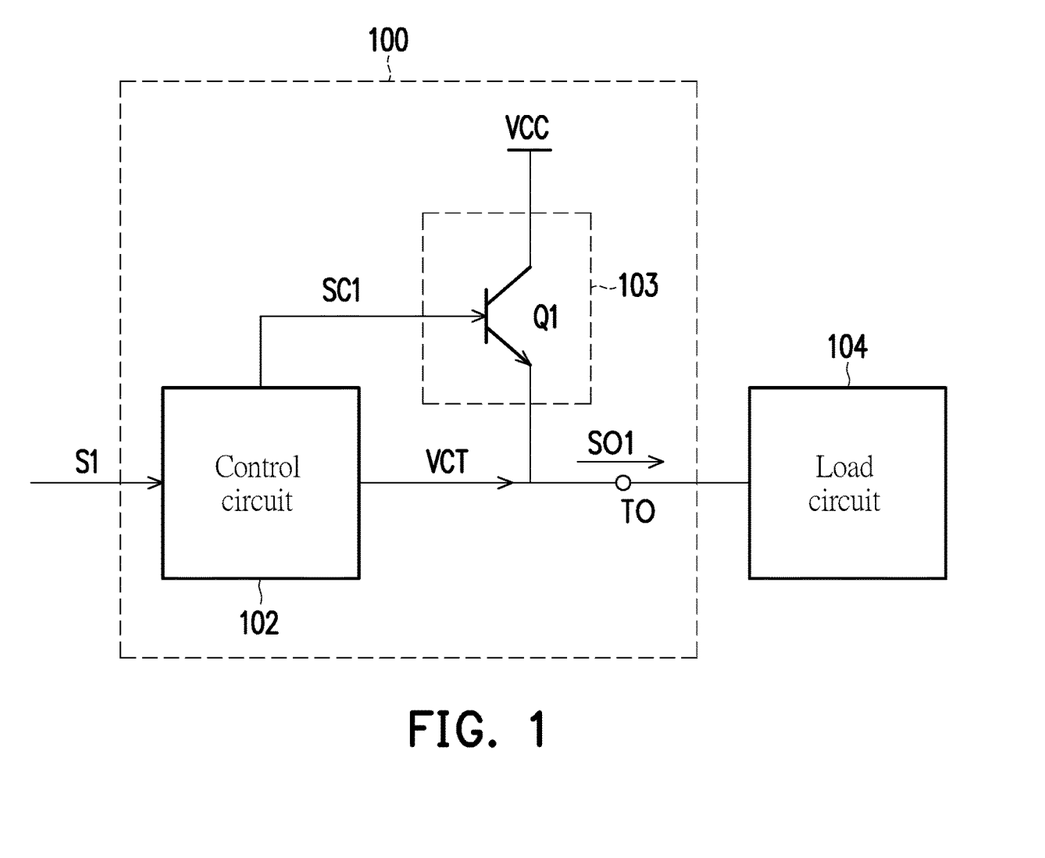
FIG. 1 is a schematic diagram of a signal conversion circuit according to an embodiment of the invention.

FIG. 1 is a schematic diagram of a signal conversion circuit according to an embodiment of the invention. Referring to FIG. 1, a signal conversion circuit 100 includes a control circuit 102 and a voltage adjustment circuit 103. The voltage adjustment circuit 103 has a control terminal, an input terminal and an output terminal. In the embodiment, the voltage adjustment circuit 103 is implemented by a bipolar junction transistor (BJT) Q1, where the control terminal, the input terminal and the output terminal of the voltage adjustment circuit 103 are respectively a base, a collector and an emitter of the bipolar junction transistor Q1. The collector and the emitter of the bipolar junction transistor Q1 are respectively coupled to a power voltage VCC and an output terminal TO of the signal conversion circuit 100, and the control circuit 102 is coupled to the bipolar junction transistor Q1. The control circuit 102 may provide a control signal SC1 to the base of the bipolar junction transistor Q1 according to an input data signal S1, so as to convert the input data signal S1 into a data power signal SO1. For example, the input data signal S1 is a digital signal, the control signal SC1 switches between two different control voltage levels according to a signal level of the input data signal S1, and the output terminal TO of the signal conversion circuit 100 outputs the data power signal SO1. The data power signal SO1 may be switched between voltages of different levels according to the voltage switching of the control signal SC1, and may also be regarded as that the data power signal SO1 switches between voltages of different levels according to signal level of the input data signal S1. Therefore, the data power signal SO1 may carry data content included in the input data signal S1 while serving as a power signal.

Alternatively, the control circuit 102 may also provide the control signal SC1 to the base of the bipolar junction transistor Q1 to turn on the bipolar junction transistor Q1, and determine whether to set a voltage of the output terminal TO of the signal conversion circuit 100 to a default voltage VCT according to the input data signal S1, so as to convert the input data signal S1 into the data power signal SO1, and output the data power signal SO1 at the output terminal TO of the signal conversion circuit 100, where the default voltage VCT is not equal to the power voltage VCC. Since the data power signal SO1 may change a signal level thereof according to whether the control circuit 102 provides the default voltage VCT to the output terminal TO of the signal conversion circuit 100, it may also be regarded as that the data power signal SO1 switches between voltages of different levels according to the signal level of the input data signal S1, so that the data power signal SO1 may carry the data content included in the input data signal S1 while serving as a power signal.

The data power signal SO1 may be, for example, output to a back-end load circuit 104. For example, a level of the data power signal SO1 varies between 4.8V and 5V, and the load circuit 104 may include a decoding circuit, an active component and/or a passive component, etc. The decoding circuit may decode a level change of the data power signal SO1 into a data signal and a power signal, and respectively provide the data signal and the power signal to a data signal processing circuit and a power supply circuit.

In this way, the input data signal S1 is integrated with the power voltage VCC to generate the data power signal SO1, so that the data power signal SO1 may not only be used as a power signal, but may also carry the data content included in the input data signal S1, and only one transmission line is needed to achieve the effect of simultaneously transmitting the data signal and the power signal, which may reduce the wiring difficulty and ensure that the data signal will not be interfered in the case of long-distance transmission, thereby greatly improving the signal transmission quality.

Figure 2:
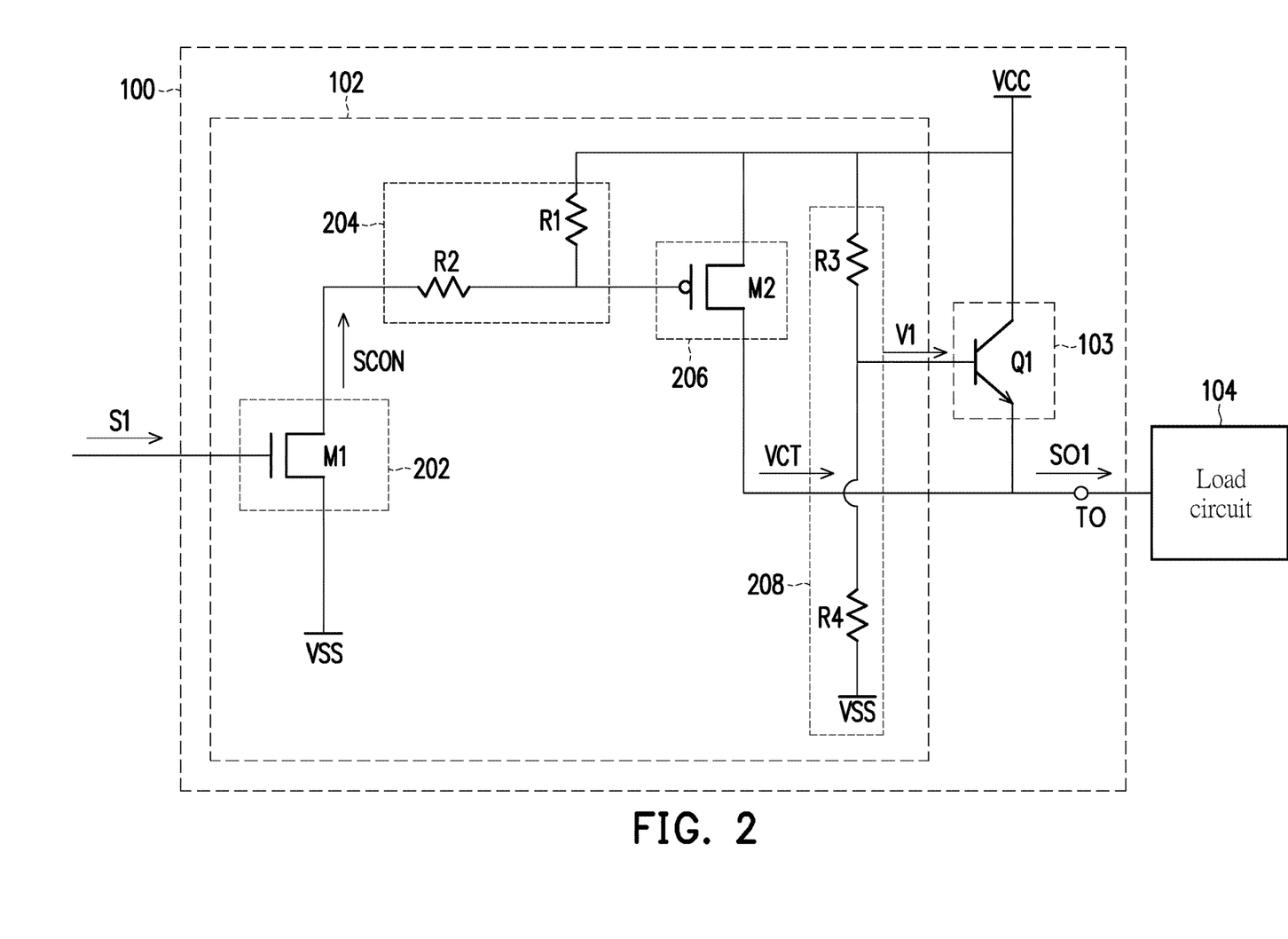
FIG. 2 is a schematic diagram of a signal conversion circuit according to another embodiment of the invention.

Another embodiment of the signal conversion circuit of the invention is shown in FIG. 2. In the embodiment of FIG. 2, the control circuit 102 may include a switch circuit 202, a voltage divider circuit 204, a switch circuit 206, and a voltage divider circuit 208, where the switch circuit 202 is coupled between the voltage divider circuit 204 and a reference voltage VSS, and the switch circuit 202 is implemented by an N-type transistor M1 in the embodiment, and the reference voltage VSS may be, for example, a ground voltage or another default voltage, but the invention is not limited thereto. In the embodiment, the power voltage VCC is set at a high voltage level, and the reference voltage VSS is set at a low voltage level (relative to the power voltage VCC). The voltage divider circuit 204 is coupled between the power voltage VCC and the switch circuit 202, and is coupled to a control terminal of the switch circuit 206. The voltage divider circuit 204 may be implemented by, for example, resistors R1 and R2 as shown in FIG. 2, but the invention is not limited thereto, and other active components and/or passive components may also be used to achieve the function of voltage division. In the embodiment, the resistors R1 and R2 are connected in series between the power voltage VC and the transistor M1, a junction of the resistors R1 and R2 is coupled to the control terminal of the switch circuit 206, the resistor R1 is coupled between the power voltage VCC and the control terminal of the switch circuit 206, and the resistor R2 is coupled between the control terminal of the switch circuit 206 and the reference voltage VSS. The switch circuit 206 is coupled between the power voltage VCC and the output terminal TO of the signal conversion circuit 100, and the switch circuit 206 may be implemented by, for example, a P-type transistor M2, but the invention is not limited thereto. In addition, the voltage divider circuit 208 includes resistors R3 and R4. The resistor R3 is coupled between the power voltage VCC and the base of the bipolar junction transistor Q1. The resistor R4 is coupled between the base of the bipolar junction transistor Q1 and the reference voltage VSS.

Figure 3:
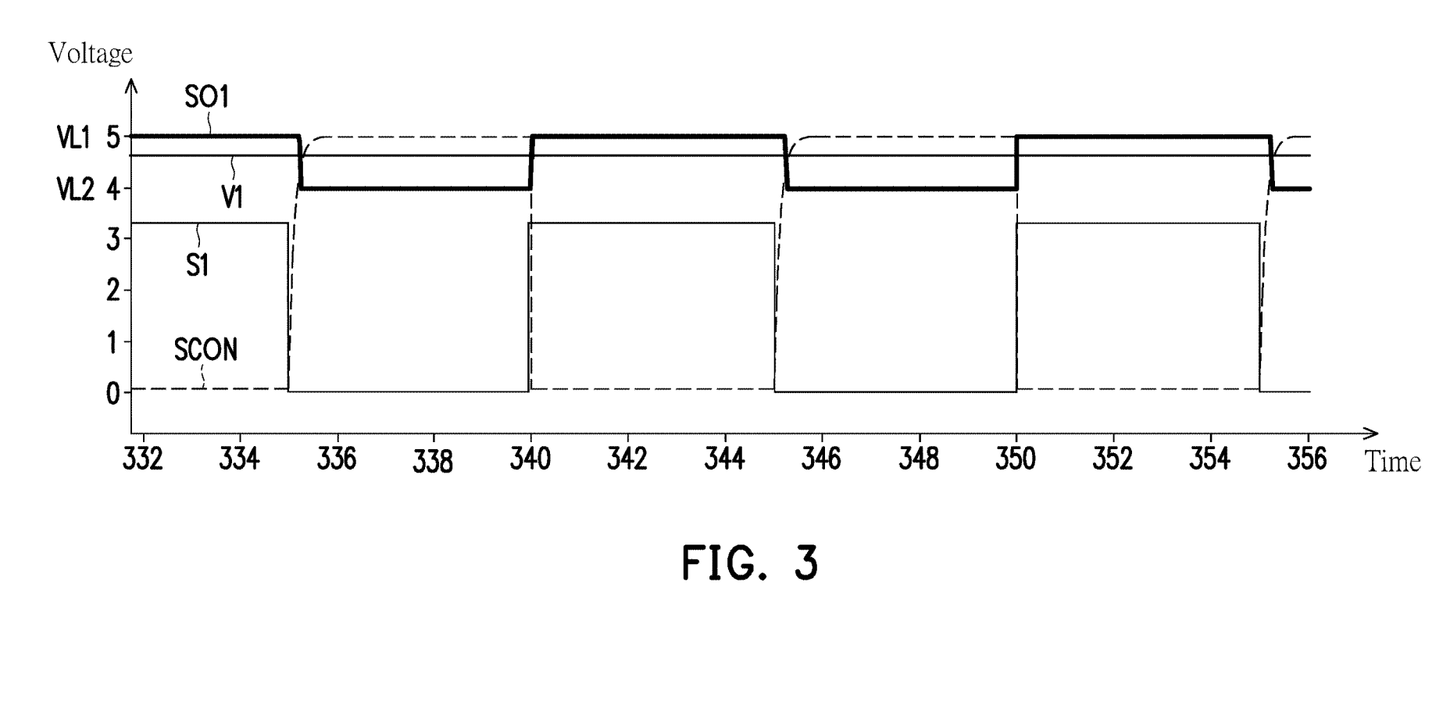
FIG. 3 is an embodiment of an operation timing diagram of the signal conversion circuit of FIG. 2.

As shown in FIG. 3, the voltage divider circuit 208 formed by the resistors R3 and R4 may divide the power voltage VCC to generate a conduction voltage V1 to serve as the above-mentioned control signal SC1 to the base of the bipolar junction transistor Q1 to turn on the bipolar junction transistor Q1. When the input data signal S1 is at a high voltage level, the switch circuit 202 (N-type transistor M1) is turned on to provide a control signal SCON of a first control voltage level (for example, a low voltage level), and the resistors R1 and R2 of the voltage divider circuit 204 may divide the power voltage VCC to provide a divided voltage to the control terminal of the switch circuit 206, so that a voltage of a control terminal (i.e., a gate of the P-type transistor M2) of the switch circuit 206 is pulled down, and the switch circuit 206 (the P-type transistor M2) thus enters a conducting state. After the switch circuit 206 is turned on, the power voltage VCC may be provided to the output terminal TO of the signal conversion circuit 100 through the switch circuit 206, and the data power signal SO1 is at a first output voltage level VL1. Moreover, when the input data signal S1 is at a low voltage level, the switch circuit 202 (N-type transistor M1) is turned off, the control signal SCON changes to a second control voltage level (for example, a high voltage level), and the voltage of the control terminal (i.e., the gate of the P-type transistor M2) of the switch circuit 206 is pulled up, and the switch circuit 206 (P-type transistor M2) thus enters a turn-off state. At this time, the bipolar junction transistor Q1 is in a conducting state according to the control signal SC1 to provide the data power signal SO1 of a second output voltage level VL2 to the output terminal TO of the signal conversion circuit 100. In the embodiment, since a voltage drop across a drain and a source of the transistor M2 is smaller than a voltage drop between the collector and the emitter of the bipolar junction transistor Q1, the first output voltage level VL1 is higher than the second output voltage level VL2. In other embodiments, the circuit design of the control circuit 102 may also be adjusted to set the first output voltage level VL1 to be lower than the second output voltage level VL2.

Figure 4:
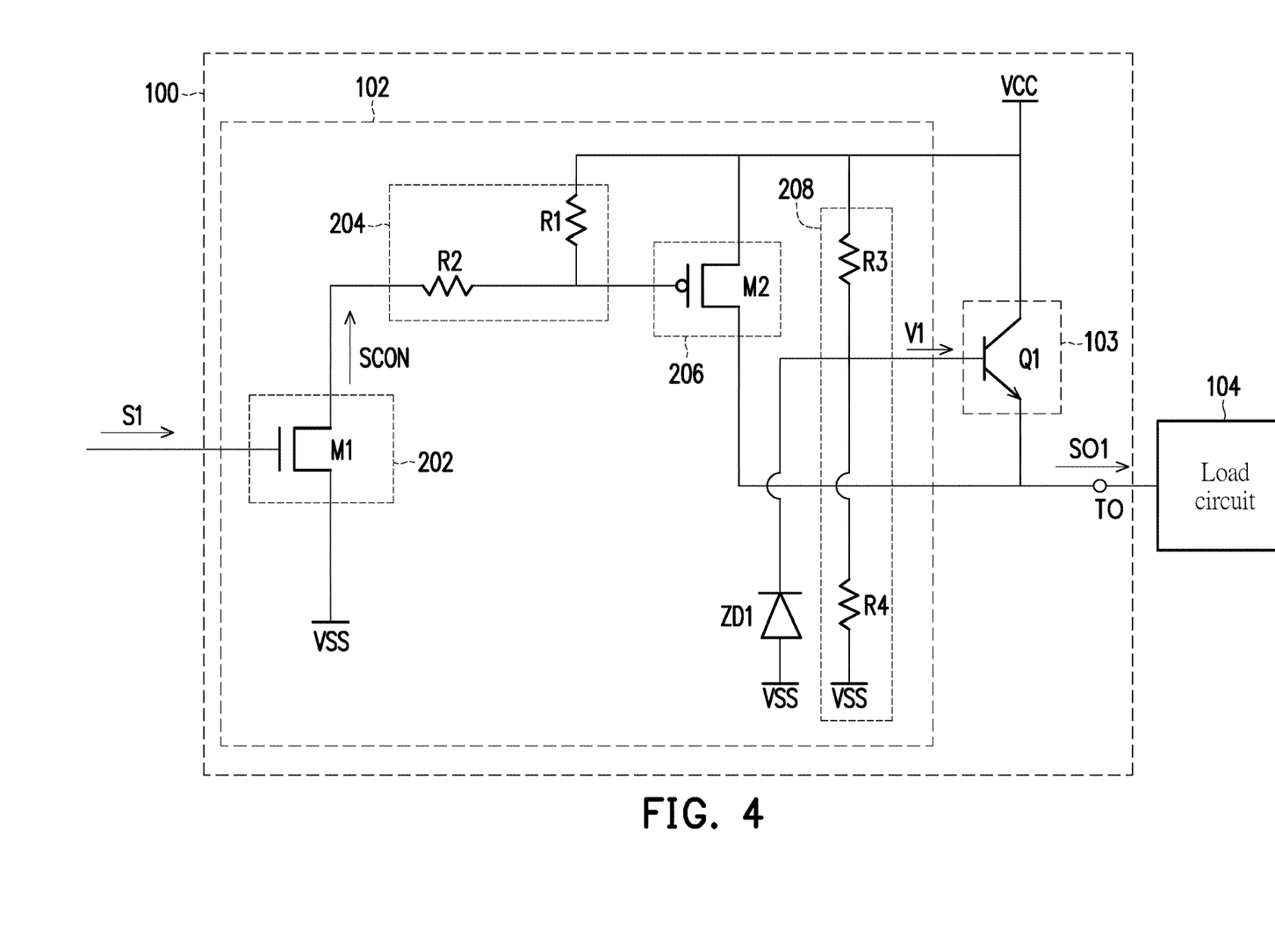
FIG. 4 is a schematic diagram of a signal conversion circuit according to another embodiment of the invention.

In another embodiment, the control circuit 102 may further include a Zener diode, as shown in FIG. 4, a Zener diode ZD1 may be coupled between the base of the bipolar junction transistor Q1 and the reference voltage VSS to achieve an effect of stabilizing the data power signal SO1. In addition, in other embodiments, the voltage divider circuits 204 and 208 in the embodiment of FIG. 3 may also be omitted, or only one of the voltage divider circuits 204 and 208 is used. For example, when the voltage divider circuit 204 is not used, the switch circuit 202 (the drain of the N-type transistor M1) may be directly coupled to the control terminal of the switch circuit 206 (i.e., the gate of the P-type transistor M2). When the voltage divider circuit 208 is not used, the base of the bipolar junction transistor Q1 is directly coupled to the power voltage VCC.

Figure 5:
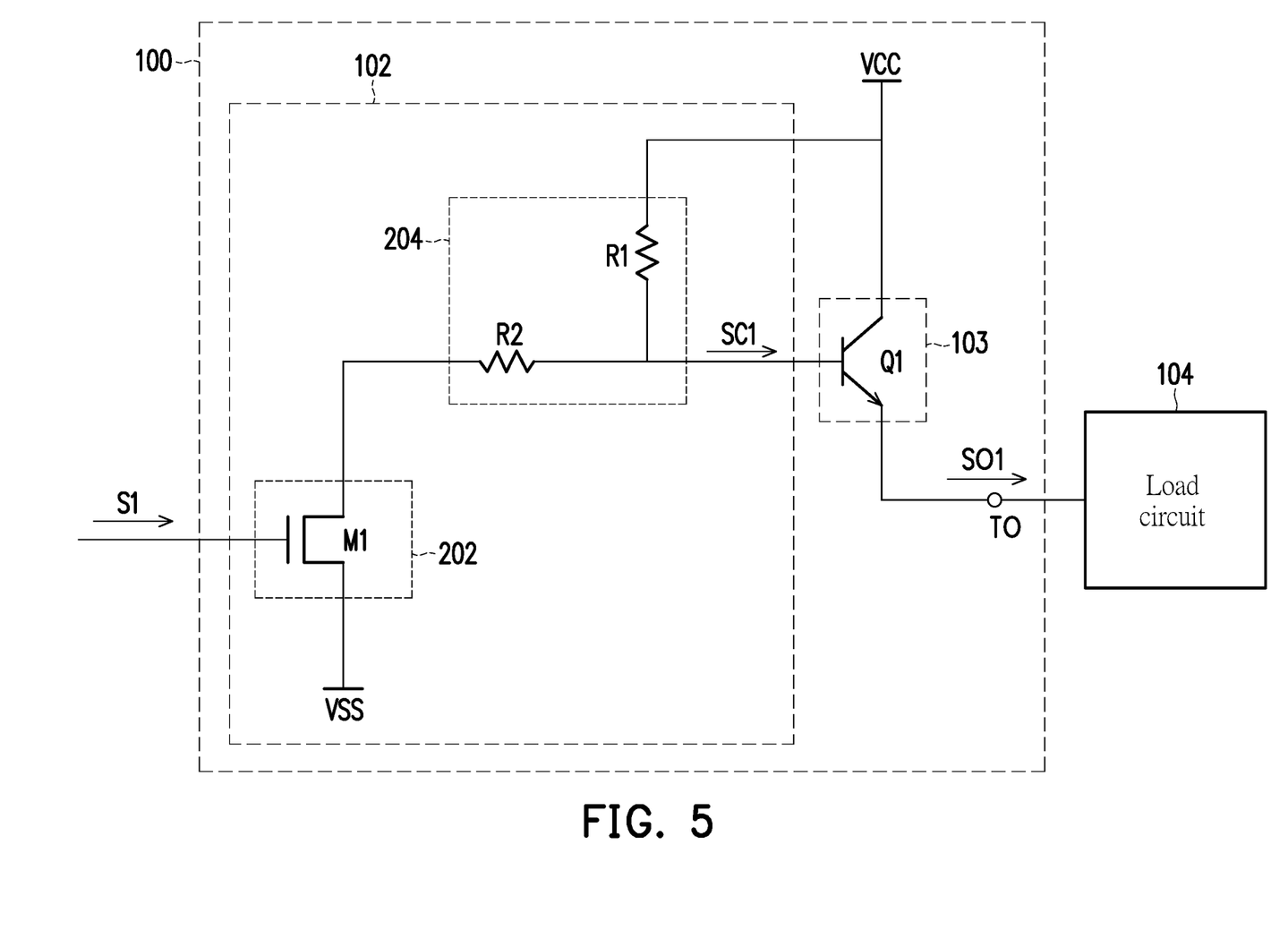
FIG. 5 is a schematic diagram of a signal conversion circuit according to another embodiment of the invention.
Figure 6:
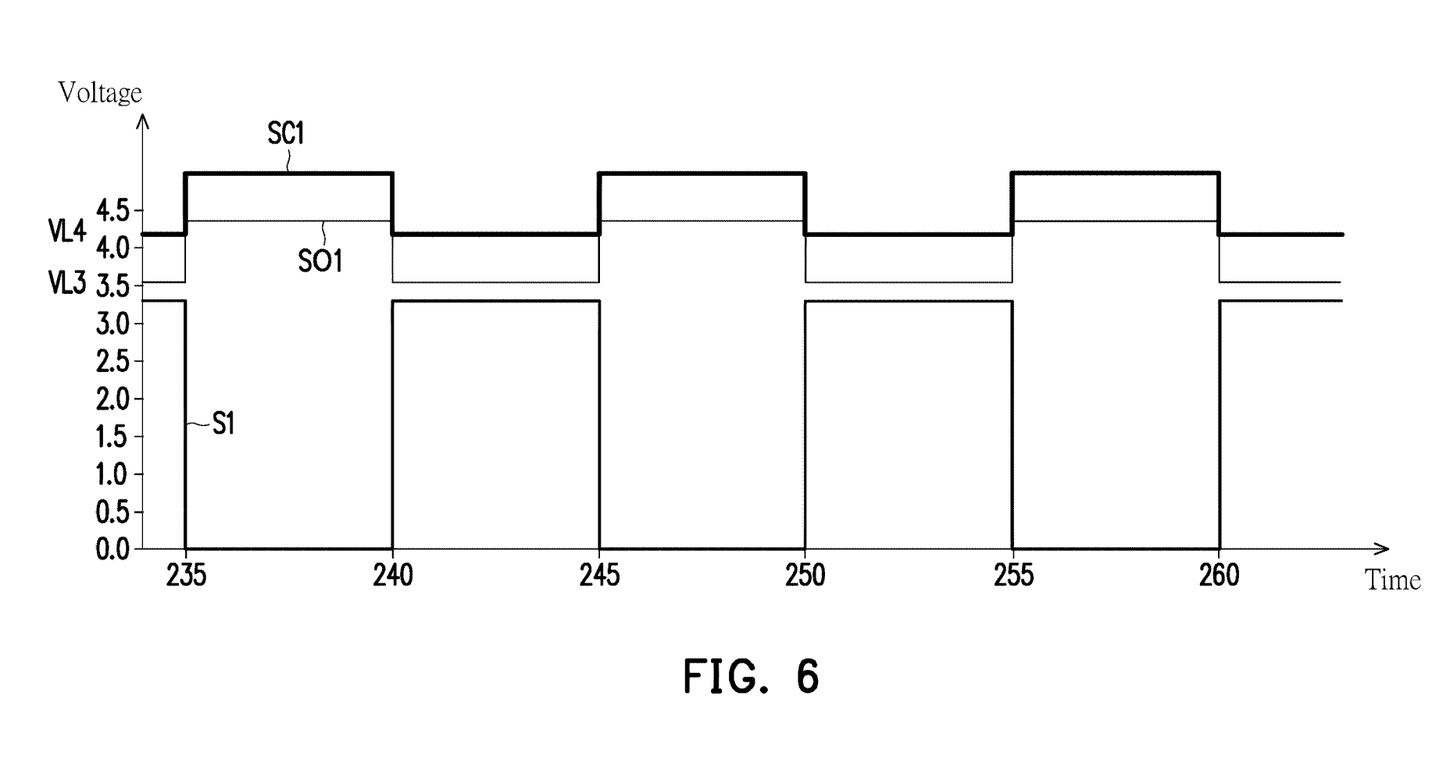
FIG. 6 is an embodiment of an operation timing diagram of the signal conversion circuit of FIG. 5.

FIG. 5 is a schematic diagram of another embodiment of a signal conversion circuit according to the invention. Compared with the embodiment in FIG. 2, the control circuit 102 of the embodiment does not include the switch circuit 206 and the voltage divider circuit 208, and in the embodiment, a junction of the resistors R1 and R2 is coupled to the base of the bipolar junction transistor Q1, the resistor R1 is coupled between the power voltage VCC and the base of the bipolar junction transistor Q1, and the resistor R2 is coupled between the base of the bipolar junction transistor Q1 and the switch circuit 202. The switch circuit 202 (N-type transistor M1) determines whether to be turned on according to the input data signal S1 to connect the voltage divider circuit 204 to the reference voltage VSS, so that the control signal SC1 generated by the voltage divider circuit 204 is correspondingly switched between voltages of the first control voltage level (for example, low voltage level) and the second control voltage level (for example, high voltage level), and the data power signal SO1 generated by the bipolar junction transistor Q1 is accordingly switched between the low voltage level and the high voltage level. As shown in FIG. 6, when the input data signal S1 is at the high voltage level, the switch circuit 202 (N-type transistor M1) is turned on, and the voltage divider circuit 204 is connected to the reference voltage VSS. The resistors R1, R2 may divide the power voltage VCC to generate the control signal SC1 of the low voltage level to the base of the bipolar junction transistor Q1, so as to generate the data power signal SO1 of a first output voltage level VL3 at the emitter of the bipolar junction transistor Q1. In addition, when the input data signal S1 is at the low voltage level, the switch circuit 202 is turned off, and the control signal SC1 is at the high voltage level, so that the emitter of the bipolar junction transistor Q1 generates the data power signal SO1 of a second output voltage level VL4. In the embodiment, the first output voltage level VL3 is lower than the second output voltage level VL4. Compared with the embodiment in FIG. 2, the circuit structure of the signal conversion circuit 100 of the embodiment of the invention may be further simplified, by which in addition to reducing the wiring difficulty and ensuring that the data signal is not interfered in long-distance transmission, signal transmission delay is mitigated, so that signal transmission quality is further improved. In addition, the signal conversion circuit 100 only uses the single power voltage VCC, which may also achieve the effect of effectively reducing signal interference.

Figure 7:
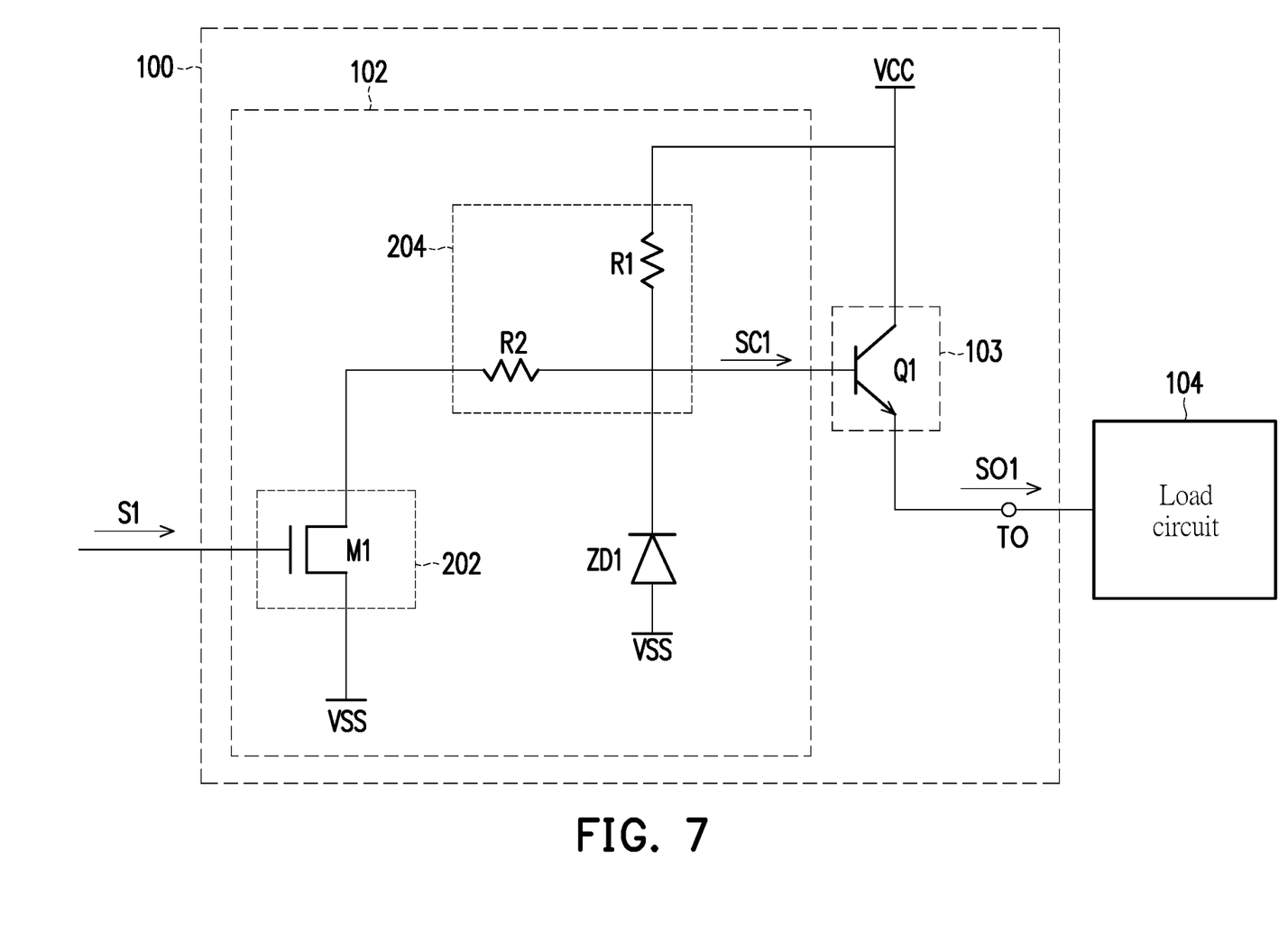
FIG. 7 is a schematic diagram of a signal conversion circuit according to another embodiment of the invention.

In another embodiment, the control circuit 102 of the embodiment in FIG. 5 may also include a Zener diode ZD1. As shown in FIG. 7, the Zener diode ZD1 may be coupled between the base of the bipolar junction transistor Q1 and the reference voltage VSS, which may achieve the effect of stabilizing the data power signal SO1.

The above embodiment uses the bipolar junction transistor Q1 to implement the voltage adjustment circuit 103, but the implementation of the voltage adjustment circuit 103 is not limited thereto. For example, in other embodiments, the voltage adjustment circuit 103 may also be implemented by a P-type metal oxide semiconductor transistor or an N-type metal oxide semiconductor transistor. For example, in the embodiments of FIG. 2 and FIG. 4, if the voltage adjustment circuit 103 is implemented by a P-type metal oxide semiconductor transistor (a source of the P-type metal oxide semiconductor transistor is coupled to the power voltage VCC, and a drain is coupled to the output terminal of the signal conversion circuit 100, and a gate receives the control signal SC1), the P-type metal oxide semiconductor transistor may operate in a triode region, and the P-type metal oxide semiconductor transistor and the transistor M2 may output different voltages, so that the data power signal SO1 switches between different voltage levels. Similarly, in the embodiments of FIG. 5 and FIG. 7, if the voltage adjustment circuit 103 is implemented by the P-type metal oxide semiconductor transistor, the data power signal SO1 may also be switched between different voltage levels by changing a gate bias of the P-type metal oxide semiconductor transistor.

In summary, the input terminal and the output terminal of the voltage adjustment circuit in the embodiment of the invention are respectively coupled to the power voltage and the output terminal of the signal conversion circuit, and the control circuit may provide the control signal to the control terminal of the voltage adjustment circuit, control the control signal to change between two different control voltage levels according to a signal level of an input data signall, or decide whether to provide the default voltage to the output terminal of the voltage adjustment circuit according to the input data signal, so as to convert the input data signal into the data power signal. In this way, the input data signal and the power voltage are integrated to generate the data power signal, and only one transmission line is needed to achieve the effect of simultaneously transmitting the data signal and the power signal, which reduces the wiring difficulty and ensures that the data signal will not be interfered in long-distance transmission, thereby greatly improving the signal transmission quality.

For example, the invention may be applied to practical system applications such as new-generation WiFi wireless access points, integrated omnidirectional positioning systems, radio frequency configuration of 5G modules, and ultra-low power consumption modules of LTE CAT-M1, etc.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A signal conversion circuit, comprising:
   a voltage adjustment circuit, comprising a control terminal, an input terminal coupled to a power voltage, and an output terminal coupled to an output terminal of the signal conversion circuit; and
   a control circuit, coupled to the voltage adjustment circuit for providing a control signal to the control terminal of the voltage adjustment circuit, controlling the control signal to change between a first control voltage level and a second control voltage level according to a signal level of an input data signal, or deciding whether to provide a default voltage to the output terminal of the voltage adjustment circuit according to the input data signal,
   wherein the control terminal of the voltage adjustment circuit is coupled to the power voltage to receive the control signal, and the control circuit comprises:
   a first switch circuit, having a control terminal receiving the input data signal; and
   a second switch circuit, coupled between the power voltage and the output terminal of the voltage adjustment circuit,
   wherein the first switch circuit is coupled between a control terminal of the second switch circuit and a reference voltage, and the first switch circuit determines whether to connect the control terminal of the second switch circuit to the reference voltage according to the input data signal, and accordingly to turn on the second switch circuit.

2. The signal conversion circuit as claimed in claim 1, wherein the first switch circuit comprises:
a transistor, coupled between the control terminal of the second switch circuit and the reference voltage, having a control terminal for receiving the input data signal.

3. The signal conversion circuit as claimed in claim 1, wherein the second switch circuit comprises:
a transistor, coupled between the power voltage and the output terminal of the voltage adjustment circuit, having a control terminal coupled to the first switch circuit.

4. The signal conversion circuit as claimed in claim 1, further comprising:
a voltage divider circuit, coupled to the power voltage, the control terminals of the first switch circuit and the second switch circuit for dividing the power voltage to provide a divided voltage to the control terminal of the second switch circuit when the first switch circuit is turned on.

5. The signal conversion circuit as claimed in claim 4, wherein the voltage divider circuit comprises:
a first resistor, coupled between the power voltage and the control terminal of the second switch circuit; and
a second resistor, coupled between the control terminal of the second switch circuit and the first switch circuit.

6. The signal conversion circuit as claimed in claim 1, further comprising:
a voltage divider circuit, coupled between the power voltage and the reference voltage, dividing the power voltage for providing a turn-on voltage as the control signal to the control terminal of the voltage adjustment circuit, wherein the turn-on voltage controls the voltage adjustment circuit to provide the power voltage.

7. The signal conversion circuit as claimed in claim 6, wherein the voltage divider circuit comprises:
a third resistor, coupled between the power voltage and the control terminal of the voltage adjustment circuit; and
a fourth resistor, coupled between the control terminal of the voltage adjustment circuit and the reference voltage.

8. The signal conversion circuit as claimed in claim 1, further comprising:
a Zener diode, having a cathode and an anode respectively coupled to the control terminal of the voltage adjustment circuit and the reference voltage.

* * * * *